United States Patent Office 3,107,164
Patented Oct. 15, 1963

3,107,164
HERBICIDAL METHODS EMPLOYING O,O-DI-ALLYL O-ARYL PHOSPHATE ESTERS
Karoly Szabo, Pleasantville, N.Y., and Chester L. Dewald, Cupertino, Calif., assignors to Stauffer Chemical Company, New York, N.Y., a corporation of Delaware
No Drawing. Filed Mar. 27, 1962, Ser. No. 182,971
6 Claims. (Cl. 71—2.6)

This invention relates to organic phosphorus compounds and, in particular, to the organophosphorus esters of the diallyl phenylphosphate type. The invention also pertains to the preparation and use of herbicidal compositions containing as the active component thereof at least one of the aforementioned organophosphorus esters.

The organophosphorus esters as contemplated herein can be depicted by the following general formulae:

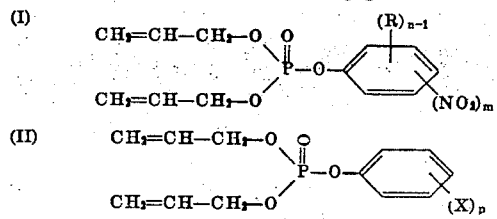

wherein R refers to hydrogen; a lower alkyl group; halogen such as chlorine or bromine; X refers to halogen such as chlorine or bromine; n is an integer of from 1 to 3; m is an integer of from 1 to 2; p is an integer of from 1 to 5 and it being further provided that the $NO_2$ radical is never situated in a position meta to the phosphoric acid function. As will be discerned from an inspection of their configuration, the novel compounds of the invention are mixed esters of phosphoric acid in which two of the esterifying group are always allyl radicals and the third esterifying moiety being a phenol residue which may have affixed thereto various nitro, lower alkyl and halogen substituents.

Exemplary structures falling within the ambit of the general formulae include the following:

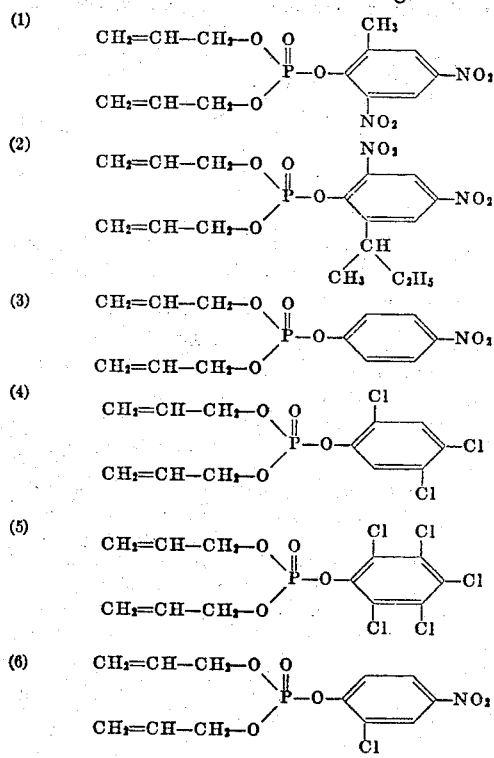

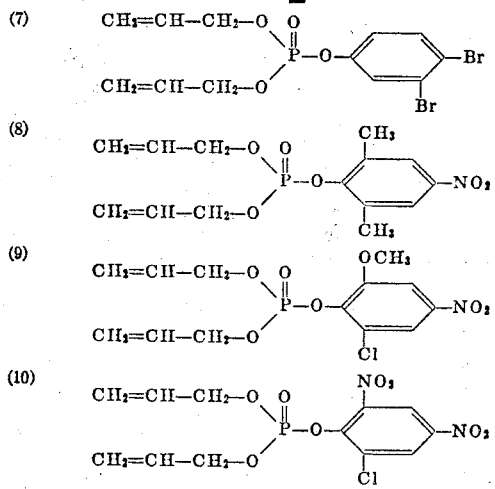

The organic phosphate esters as above represented are extremely valuable and useful compounds since it has been discovered that these entities possess remarkably high herbicidal activity and are therefore eminently suitable in the formulation of herbicidal compositions. For example compound 2 when applied in a concentration of 2 lbs. per acre gave 100% kill of mustard, tobacco and related broad leaf plants. In this evaluation, a standard post-emergent test was used, i.e. the herbicidal composition containing the active component was sprayed on the foliage of the plants. Similar results were obtained in the case of compounds 1 and 6.

The compounds are desirably employed as an aqueous dispersion which can be conveniently applied to the soil in the form of a spray. A typical test procedure comprises planting weed seeds in the soil to a depth of about ½" and the toxicant applied to the soil on the following day by spraying in the form of an aqueous dispersion, using a number 152 De Vilbiss atomizer at a rate of 10 lbs. in 80 gallons of solution per acre. This concentration of the toxicant was found to exhibit excellent herbicidal activity.

The technique of producing aqueous dispersions of plant toxicants is well known to the herbicidal art. In general, such dispersions are formulated by dissolving the herbicidal compound in an organic solvent in the presence of a surface active agent and the resulting organic solution added to water with thorough and vigorous agitation thereby forming minute particles of the plant toxicant suspended in the aqueous media. If a water immiscible solvent is selected to effect dissolution, then dispersions prepared therefrom by dilution with water will consist of oily droplets containing dissolved toxicant distributed throughout the aqueous phase. On the other hand, should a water miscible solution of the compound be diluted with water, then the resulting dispersion will consist of minute particles of the solid active component suspended throughout the aqueous medium. Typical water immiscible solvents for use as above described are kerosene, Stoddard solvent, aromatic hydrocarbons such as xylene, toluene and the like, higher alcohols, alkylated naphthalenes etc. Suitable water miscible solvents include the lower water soluble ketones as exemplified by acetone and methyl ethyl ketone, certain of the lower amides such as dimethyl formamide, diethyl formamide and the like, lower saturated aliphatic alcohols as typified by ethanol, isopropanol, various glycol ethers particularly cellosolves such as methylcellosolve, ethylcellosolve and the like.

Typical surface active agents for preparing the aforedescribed dispersion include the sulfonated animal and vegetable oils, sulfonated petroleum oils, sodium lauryl sulfonate, ethylene oxide condensation products of the type produced by reacting octylphenol with ethylene oxide, higher alkyl pyridinium halides as exemplified by laurylpyridinium bromide and cetyldimethylbenzylammonium chloride. In general, highly satisfactory results ensue when the surface active agent constitutes about 1–15% by weight of the composition. We have, for instance, ascertained that excellent herbicidal compositions containing at least one of the organophosphorus esters of the invention can be produced by dissolving toxicant in acetone followed by a dilution with water in the presence of Methocel (methylated cellulose) and Vatsol (sodium salt of isopropylnaphthalene sulfonate).

The organic phosphates of the invention are prepared by a condensation type of reaction in which diallyl phosphorochloridate is reacted in the presence of a basic condensing agent with a phenol represented by the following formulae:

(III)

$$HO-\underset{(NO_2)_m}{\overset{(R)_{n-1}}{\bigcirc}}$$

11.0 g. of diallyl phosphorochloridate was added dropwise to a mixture of 10.0 g. of 2-chloro-4-nitrophenol, 10.0 g. of sodium carbonate (anhydrous) and 50 ml. of acetone. Thorough agitation was maintained while introducing the diallyl phosphorochloridate. During the addition, the temperature of the reaction mixture increased from 24 to 35° C. after which it was refluxed for 10 minutes. The reaction mixture was allowed to cool to ambient temperature and the salts removed by suction filtration and the filtrate distilled in vacuo to remove volatile components. The residue from the distillation was dissolved in 50 ml. benzene and the solution washed twice with water. The organic layer was separated, dried over anhydrous magnesium sulfate, filtered and the solvent removed by distillation. There was obtained a residue of a yellow oil having a $N_D^{25}$ of 1.5306.

The diallyl phosphorochloridate used as an intermediate in the above described synthesis was obtained by chlorinating diallyl phosphite with N-chlorosuccinimide.

Following the procedure of Example 1, the following diallyl phenyl phosphate esters were synthesized:

| Compound | Name | |
|---|---|---|
| 1 | Diallyl (2,4-dinitro-o-cresyl) phosphate $$CH_2=CH-CH_2-O\diagdown\underset{CH_2=CH-CH_2-O}{\overset{O}{\underset{\diagup}{P}}}-O-\underset{NO_2}{\overset{CH_3}{\bigcirc}}-NO_2$$ | Brown oil. $N_D^{25}$ 1.5617 |
| 2 | Diallyl (2-sec-butyl-4,6-dinitrophenyl) phosphate $$CH_2=CH-CH_2-O\diagdown\underset{CH_2=CH-CH_2-O}{\overset{O}{\underset{\diagup}{P}}}-O-\underset{\underset{CH_3\diagdown C_2H_5}{CH}}{\overset{NO_2}{\bigcirc}}-NO_2$$ | Yellow oil. $N_D^{25}$ 1.5555 |
| 3 | Diallyl (p-nitrophenyl) phosphate $$CH_2=CH-CH_2-O\diagdown\underset{CH_2=CH-CH_2-O}{\overset{O}{\underset{\diagup}{P}}}-O-\bigcirc-NO_2$$ | Light brown oil. $N_D^{25}$ 1.5293 |
| 4 | Diallyl (2,4,5-trichlorophenyl) phosphate $$CH_2=CH-CH_2-O\diagdown\underset{CH_2=CH-CH_2-O}{\overset{O}{\underset{\diagup}{P}}}-O-\underset{Cl}{\overset{Cl}{\bigcirc}}-Cl$$ | Yellow oil. $N_D^{25}$ 1.5451 |

(IV)

$$HO-\underset{(X)_p}{\bigcirc}$$

wherein R, X, n, m and p have the significance as previously defined. Alternately the compounds can be produced by reacting phosphorus oxychloride with a phenol and the resulting 2-chloro-4-nitrophenyl phosphinodichlorodate intermediate then condensed with 2 moles of allyl alcohol in the presence of a base to give the phosphate ester.

The following example illustrates in greater detail the procedure for obtaining the aforedescribed organic phosphates.

EXAMPLE 1

*Diallyl 2-Chloro-4-Nitrophenyl Phosphate*

$$CH_2=CH-CH_2-O\diagdown\underset{CH_2=CH-CH_2-O}{\overset{O}{\underset{\diagup}{P}}}-O-\underset{Cl}{\bigcirc}-NO_2$$

We claim:
1. A method of inhibiting the growth of weeds comprising applying to the soil a herbicidal amount of an organic phosphate ester selected from the group having the following general formulae:

$$CH_2=CH-CH_2-O\diagdown\underset{CH_2=CH-CH_2-O}{\overset{O}{\underset{\diagup}{P}}}-O-\underset{(NO_2)_m}{\overset{(R)_{n-1}}{\bigcirc}}$$

$$CH_2=CH-CH_2-O\diagdown\underset{CH_2=CH-CH_2-O}{\overset{O}{\underset{\diagup}{P}}}-O-\underset{(X)_p}{\bigcirc}$$

wherein R is selected from the class consisting of hydrogen, a lower alkyl group, chlorine and bromine; X is selected from the class consisting of chlorine and bromine; n is an integer of from 1 to 3; m is an integer of from 1 to 2 and p is an integer of from 1 to 5, it being understood that the $NO_2$ radical is never meta to the phosphoric acid function.

2. A method of inhibiting the growth of weeds comprising applying to the soil a herbicidal amount of an organic ester of the formula:

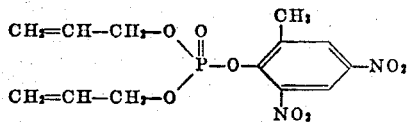

3. A method of inhibiting the growth of weeds comprising applying to the soil a herbicidal amount of an organic ester of the formula:

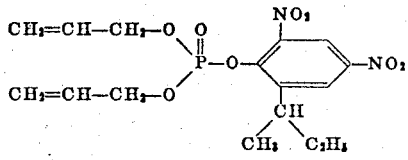

4. A method of inhibiting the growth of weeds comprising applying to the soil a herbicidal amount of an organic ester of the formula:

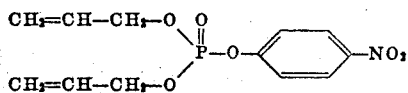

5. A method of inhibiting the growth of weeds comprising applying to the soil a herbicidal amount of an organic ester of the formula:

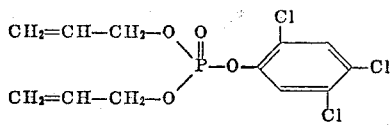

6. A method of inhibiting the growth of weeds comprising applying to the soil a herbicidal amount of an organic ester of the formula:

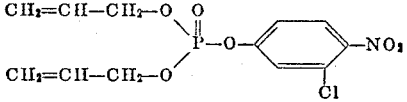

References Cited in the file of this patent
UNITED STATES PATENTS

| | | |
|---|---|---|
| 2,520,393 | Fletcher | Aug. 29, 1950 |
| 2,690,450 | Gilbert et al. | Sept. 28, 1954 |
| 2,758,954 | Tidwell | Aug. 14, 1956 |

FOREIGN PATENTS

| | | |
|---|---|---|
| 257,649 | Switzerland | May 2, 1949 |
| 41 | Philippines | Dec. 15, 1949 |